US011125279B2

(12) United States Patent
Raber (10) Patent No.: US 11,125,279 B2
(45) Date of Patent: Sep. 21, 2021

(54) SELF-REINFORCING FRICTION CLUTCH HAVING LEAF SPRINGS (71) Applicant: Schaeffler Technologies AG & Co. KG, Herzogenaurach (DE)

(72) Inventor: Christoph Raber, Ottweiler-Steinbach (DE)

(73) Assignee: SCHAEFFLER TECHNOLOGIES AG & CO. KG, Herzogenaurach (DE)

(*) Notice: Subject to any disclaimer, the term of this patent is extended or adjusted under 35 U.S.C. 154(b) by 0 days.

(21) Appl. No.: 16/635,078

(22) PCT Filed: Jul. 17, 2018

(86) PCT No.: PCT/DE2018/100652
§ 371 (c)(1),
(2) Date: Jan. 29, 2020

(87) PCT Pub. No.: WO2019/029766
PCT Pub. Date: Feb. 14, 2019

(65) Prior Publication Data
US 2020/0248757 A1 Aug. 6, 2020

(30) Foreign Application Priority Data

Aug. 8, 2017 (DE) .......................... 102017118026.5
Nov. 15, 2017 (DE) .......................... 102017126799.9

(51) Int. Cl.
F16D 13/70 (2006.01)
F16D 13/58 (2006.01)

(52) U.S. Cl.
CPC ........... *F16D 13/70* (2013.01); *F16D 13/585* (2013.01); *F16D 2013/706* (2013.01)

(58) Field of Classification Search
CPC ... F16D 13/70; F16D 13/585; F16D 2013/706
See application file for complete search history.

(56) References Cited

U.S. PATENT DOCUMENTS

| 4,615,424 | A |   | 10/1986 | Kohler |   |
|---|---|---|---|---|---|
| 5,090,537 | A | * | 2/1992 | Fukuda | F16D 13/385 192/111.4 |
| 5,794,750 | A | * | 8/1998 | Jackel | F16D 13/76 192/70.17 |
| 2002/0180131 | A1 |   | 12/2002 | Bach et al. |   |
| 2010/0258399 | A1 |   | 10/2010 | Simon et al. |   |

(Continued)

FOREIGN PATENT DOCUMENTS

| CN | 101196219 A | 6/2008 |
|---|---|---|
| CN | 103052822 A | 4/2013 |
| CN | 203146645 U | 8/2013 |

(Continued)

*Primary Examiner* — Charles A Fox
*Assistant Examiner* — Lori Wu
(74) *Attorney, Agent, or Firm* — Kevin L. Parks (57) ABSTRACT A friction clutch includes an axis of rotation, a disk spring, a plurality of leaf springs, a clutch cover and a pressure plate. The disk spring is for engaging the friction clutch. The disk spring includes tongues. The plurality of leaf springs is axially fixed to the tongues. The pressure plate is axially displaceable relative to the clutch cover and attached to the clutch cover in a torsion-resistant manner by the plurality of leaf springs.

17 Claims, 4 Drawing Sheets

(56) References Cited

U.S. PATENT DOCUMENTS

2017/0097052 A1\* 4/2017 Reimnitz ................ F16D 21/06
2019/0264754 A1\* 8/2019 Hassler .................. F16D 13/48

FOREIGN PATENT DOCUMENTS

| | | |
|---|---|---|
| CN | 104364542 A | 2/2015 |
| CN | 104685246 A | 6/2015 |
| DE | 4311908 A1 | 10/1993 |
| DE | 4345641 B4 | 3/2011 |
| DE | 102013213852 A2 | 1/2014 |
| DE | 102014224947 A1 | 6/2016 |
| DE | 102016218354 A1 | 4/2017 |
| DE | 102016201525 A1 | 8/2017 |
| GB | 1351891 A | 5/1974 |
| JP | 5913127 A | 1/1984 |
| JP | 2010540851 A | 12/2010 |

\* cited by examiner

SELF-REINFORCING FRICTION CLUTCH HAVING LEAF SPRINGS

CROSS-REFERENCE TO RELATED APPLICATIONS

This application is the United States National Phase of PCT Appln. No. PCT/DE2018/100652 filed Jul. 17, 2018, which claims priority to German Application Nos. DE102017118026.5 filed Aug. 8, 2017 and DE102017126799.9 filed Nov. 15, 2017, the entire disclosures of which are incorporated by reference herein.

TECHNICAL FIELD

The present disclosure relates to a friction clutch having (inner) leaf springs, in particular leaf springs arranged within the pressure plate cams, which leaf springs are attached to tongues of the disk spring for the self-reinforcement of the friction clutch.

The disclosure relates, in particular, to a friction clutch which is suitable for coupling a drive shaft of a motor vehicle (e.g. a car, truck or motorcycle) to a gearbox input shaft of a gearbox, wherein the friction clutch additionally has a counter-plate and the pressure plate is provided for pressing a clutch disk with friction fit between the counter-plate and the pressure plate.

BACKGROUND

The generation of the pressure force in present-day dry clutches generally takes place by means of a disk spring or thrust spring. These are generally configured for the maximally occurring engine torque (plus reliability) in order to ensure a reliable torque transmission between the internal combustion engine and the gearbox. The force exerted on the pressure plate by the disk or thrust spring correlates with the actuating force of the clutch. High engine torques require correspondingly high pressure forces, which therefore involves high actuating forces. Self-reinforcing friction clutches are known, which enable high pressure forces with comparatively moderate actuating forces.

SUMMARY

A friction clutch is proposed, having a disk spring engaging the friction clutch, a clutch cover, and a pressure plate, which is capable of limited displacement in the axial direction and is attached to the clutch cover in a torsion-resistant manner by leaf springs. The leaf springs are attached to tongues of the disk spring in a fixed manner in the axial direction.

The leaf springs extend between a first end and a second end, at least in a circumferential direction and in an axial direction. The leaf springs are arranged in particular individually or in packs (i.e. a plurality of leaf springs stacked on top of one another) such that they are distributed (in particular at equal distances) along the circumferential direction.

In particular, the leaf springs, in the radial direction, are arranged within pressure plate cams, on which the disk spring is supported in a tiltable manner for engaging and disengaging the friction clutch.

In particular, in the case of the friction clutch, e.g. a motorcycle dry clutch, the leaf springs, by means of which the pressure plate is attached to the clutch cover in a torsion-resistant manner (possibly at a certain relief angle), are arranged within the pressure plate cams in the radial direction. The leaf springs, preferably ends of the leaf springs, are connected (directly or indirectly, e.g. via a thrust piece) to the tongues of the disk spring in a fixed manner in the axial direction in order to exert a force on the tongues of the disk spring which engages the friction clutch in the traction mode of the internal combustion engine and to exert a force on the tongues of the disk spring which disengages the friction clutch in the coasting mode of the internal combustion engine.

The torsion-resistant attachment of the pressure plate to the clutch cover preferably takes place takes place at a certain relief angle.

The relief angle denotes, in particular, an angle about which the pressure plate and clutch cover can be rotated relative to one another in a circumferential direction.

Two groups of leaf springs can be provided, namely clutch-cover-side (first group) and pressure-plate-side (second group) leaf springs, which are connected to one another via a thrust piece, in which the tongues of the disk spring are received in an axially fixed manner.

The present disclosure of the invention describes a self-reinforcing principle, which serves to increase the pressure force with the aid of a self-reinforcing mechanism described below. Furthermore, this principle likewise serves to reduce the maximally transmissible coasting torque of the clutch. This may be important when using a dry clutch of this type in motorcycles.

The implementation of this force reinforcement is based on the leaf spring principle. The principle is implemented here such that the transmission ratio of the clutch can be used for self-reinforcement.

To realize relevant reinforcements in a single-disk dry clutch, it would be necessary to increase the reinforcement angle of the leaf springs to an extreme extent. To realize a factor of greater than 2 between the traction and coasting torque, an angle between 70° (angular degrees) and 75° would have to be constructively implemented in order to transmit, for example, 170 Nm ([Newton meters]) in traction mode and 80 Nm in coasting mode.

However, the consequence of such an angle is that the torque can no longer be transmitted in coasting mode. There are conceivable solutions, with leaf springs for both directions and a large relief angle of the pressure plate between traction mode and coasting mode.

The problems described above are very easily solvable when the transmission ratio can be additionally used for reinforcement. The transmission is used in that, in the traction direction, the clutch is further engaged via the tongues and, in the coasting direction, the clutch is disengaged via the tongues. This additional traction or pressure force is realized via the principle of leaf-spring reinforcement.

In this case, the small reinforcement angle of the leaf springs is compensated by the transmission ratio of the clutch.

In the exemplary embodiment, there is a pressure-plate-side thrust piece (second thrust-piece disk), which is attached to the pressure plate in a torsion-resistant manner via (a) pressure-plate-side (second group of) leaf springs (possibly at a certain relief angle), and a clutch-cover-side thrust piece (first thrust-piece disk), which is attached to the clutch cover in a torsion-resistant manner via (a) clutch-cover-side (first group of) leaf springs (possibly at a certain relief angle).

The leaf springs of a first group can be attached by a first end to the clutch cover and by a second end to a respective first attachment on the thrust piece. The leaf springs of a second group can be attached by a first end to the pressure plate and by a second end to a respective second attachment on the thrust piece.

The first attachments and the second attachments can be arranged between the pressure plate and the clutch cover in the axial direction.

In particular, each leaf spring of the first group can extend in a first circumferential direction from the first end to the second end (of each leaf spring of the first group) and each leaf spring of the second group can extend in an (aligned) first circumferential direction from the first end to the second end (of each leaf spring of the second group).

In particular, the leaf springs of the first group can extend in the axial direction between the first end and the second end (of each leaf spring of the first group), at a maximal first angle with respect to a circumferential direction, and the leaf springs of the second group can extend in the axial direction between the first end and the second end (of each leaf spring of the second group), at a maximal second angle with respect to the circumferential direction, wherein the first angle and the second angle are the same size.

The maximal angle (irrespective of whether the first angle and the second angle are the same size) is, for example, between 5 and 45 angular degrees, preferably between 5 and 30 angular degrees, particularly preferably between 5 and 20 angular degrees.

The thrust piece can comprise (at least) a first thrust-piece disk and a second thrust-piece disk, which are connected to one another (e.g. via rivets), wherein the tongues of the disk spring are arranged between the first thrust-piece disk and the second thrust-piece disk in the axial direction.

In particular, the leaf springs are connected to the thrust piece or the respective thrust-piece disk via rivets (possibly via the rivets which are provided for connecting the thrust-piece disks).

The disk spring can be actuated for the displacement of the pressure plate via the thrust piece.

In particular, the thrust piece is connected to a hub, on which the thrust-piece disks are arranged in an axially fixed manner. In particular, the thrust piece (and, via the thrust piece, the disk spring) can be actuated via the hub.

The pressure plate introduces its torque via leaf springs (second group of leaf springs) into the thrust piece (second thrust-piece disk) located below the pressure plate, i.e. on the pressure plate side, with reference to the accompanying figures. This torque is introduced via the rivet heads of the leaf spring rivet arrangement on the pressure-plate side into the thrust piece (first thrust-piece disk) on the coupling-cover side, which is arranged below the disk spring with reference to the accompanying figures. This thrust piece (first thrust-piece disk) is fastened to the coupling cover via coupling-cover-side leaf springs (first group of leaf springs). Within this (in the exemplary embodiment) two-part thrust piece, the tongues of the disk spring are received in a fixed manner in the axial direction and therefore attached indirectly to the ends of the pressure-plate-side and coupling-cover-side leaf springs in an axially fixed manner.

The illustrated exemplary embodiment relates to a dry motorcycle clutch, in which the clutch cover simultaneously forms part of the flywheel mass.

Both thrust pieces (thrust-piece disk) are axially connected in the rotational center by way of an additional component (hub) via a, preferably non-destructively releasable, connection. However, the torque flow of the two thrust pieces could also be realized via the additional component.

The leaf spring angles are selected such that they act preferably equally and oppositely. In the traction direction, the generated axial forces of the leaf spring packs act in the same direction and push the clutch further closed, i.e. exert a self-reinforcing force in the engagement direction. In the coasting direction, the generated axial forces of the leaf springs act in the same direction and pull the clutch open, i.e. disengage the clutch.

The preferably equal angle (first angle, second angle) of the leaf springs is advantageous for keeping the relative deflections of the two leaf spring groups (pressure-plate-side leaf springs—second group—and clutch-cover-side leaf springs—first group) as equal as possible.

The opposite arrangement enables the total deflection to be kept to virtually zero. In the illustrated exemplary embodiment, a clutch with a tensioned disk spring is shown, which is actuated by the gearbox input shaft. However, in principle, it is also possible to transfer the concept to normally engaged, push-actuated clutches, in which the clutch cover is conventionally screwed to the flywheel, which simultaneously forms the counter-pressure plate of the clutch, ideally the secondary side of a two-mass flywheel.

By way of precaution, it should be noted that the numerals ("first", "second" . . . ) used here serve primarily (merely) to distinguish between a plurality of similar objects, values or processes in relation to one another; that is to say, in particular, they do not necessarily specify a dependence and/or an order of these objects, values or processes in relation to one another. Should a dependence and/or order be necessary, this is explicitly mentioned here or becomes obvious to the person skilled in the art upon examination of the specifically described configuration.

BRIEF DESCRIPTION OF THE DRAWINGS

The disclosure and the technical field are explained in more detail below with reference to the figures. It should be noted that the disclosure is not intended to be restricted by the exemplary embodiments shown. In particular, unless explicitly stated otherwise, it is also possible to extract partial aspects of the substantive matter explained in the figures and to combine it with other elements and findings from the present description and/or figures. In particular, it should be noted that the figures and, in particular, the ratios illustrated are merely schematic. Identical reference signs denote identical objects, which means that explanations from other figures may be used in a supplementary manner, where appropriate. In the figures.

DETAILED DESCRIPTION

Figures 1, 2:
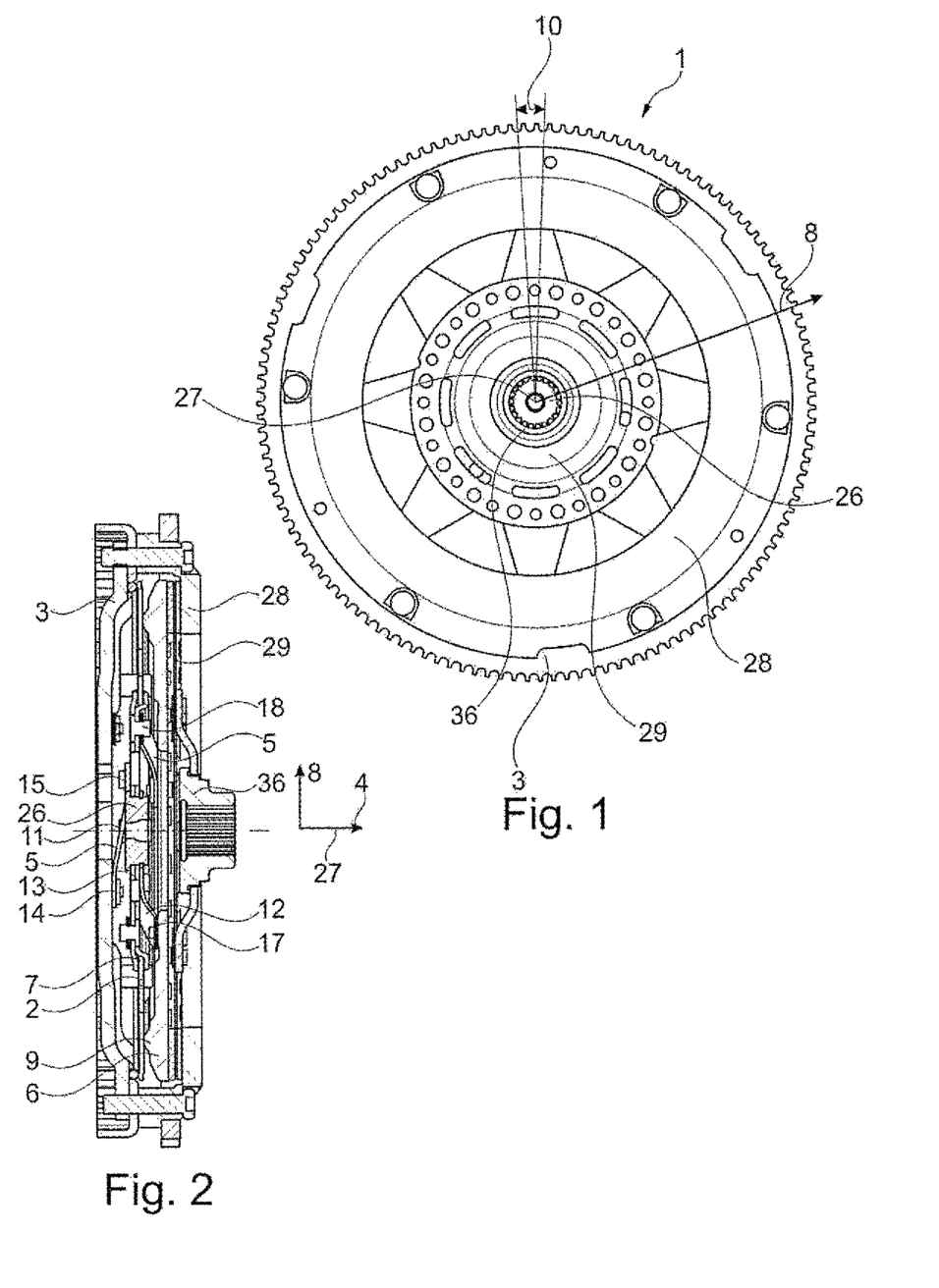
FIG. 1 shows a friction clutch, additionally with counter-plate and clutch disk in a view along the axis of rotation.
FIG. 2 shows the friction clutch according to FIG. 1 in a side view in section.

FIG. 1 shows a friction clutch 1 additionally with a counter-plate 28 and clutch disk 29 in a view along the axis of rotation 27. FIG. 2 shows the friction clutch 1 according to FIG. 1 in a side view in section. FIGS. 1 and 2 are described together below.

The friction clutch 1 additionally has a counter-plate 28, wherein the pressure plate 6 is provided for pressing the clutch disk 29 with friction fit between the counter-plate 28 and the pressure plate 6.

The friction clutch comprises a disk spring 2, a clutch cover 3 (here screwed to the flywheel and the counter-plate 28) and a pressure plate 6, which is capable of limited displacement in the axial direction 4 and is attached to the clutch cover 3 in a torsion-resistant manner by leaf springs 5, wherein the leaf springs 5 are attached to tongues 7 of the disk spring 2 in a fixed manner in the axial direction 4.

Figures 3, 4:
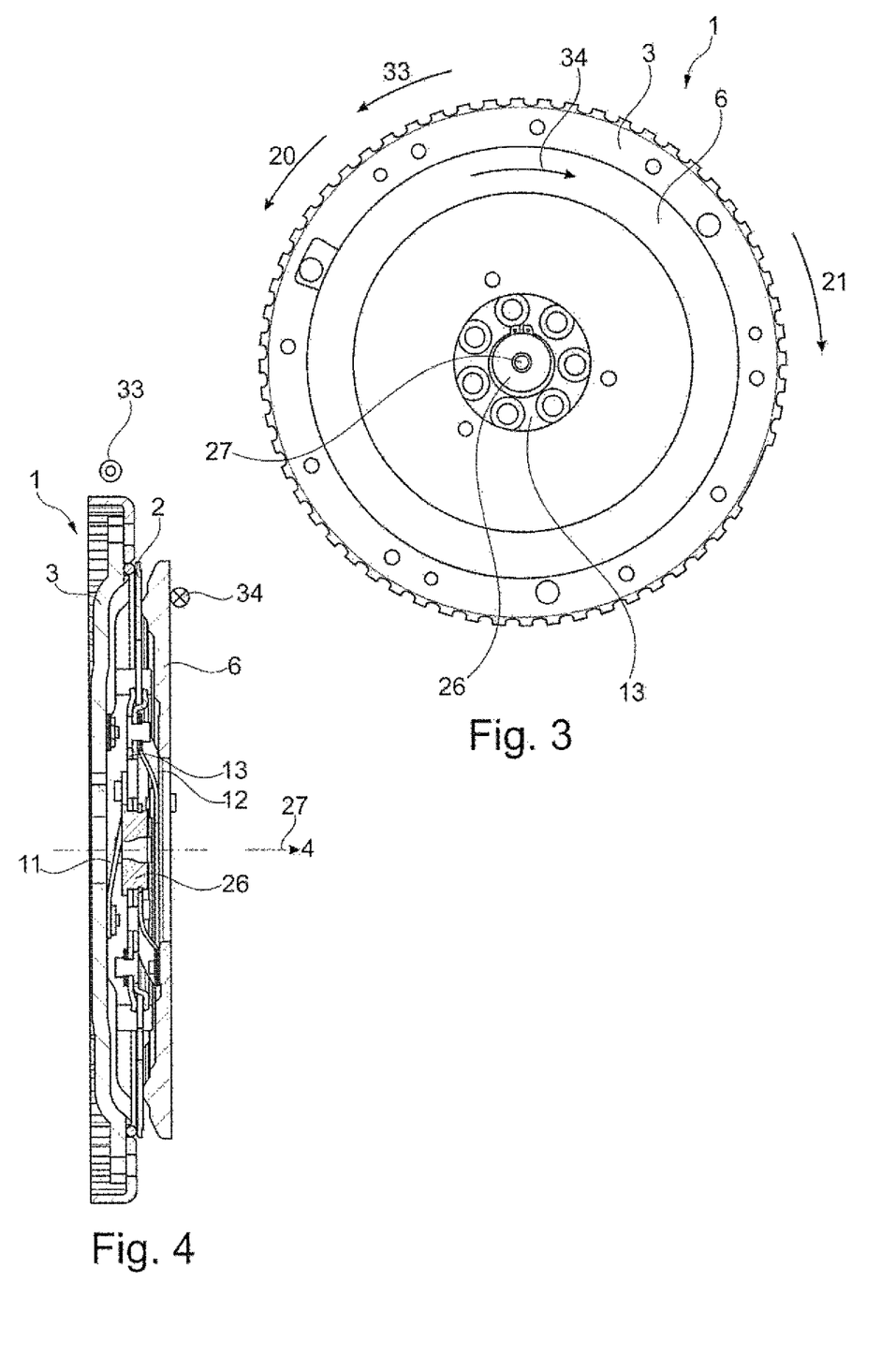
FIG. 3 shows the friction clutch according to FIG. 1 in a view along the axis of rotation.
FIG. 4 shows the friction clutch according to FIG. 3 in a side view in section.
Figure 5:
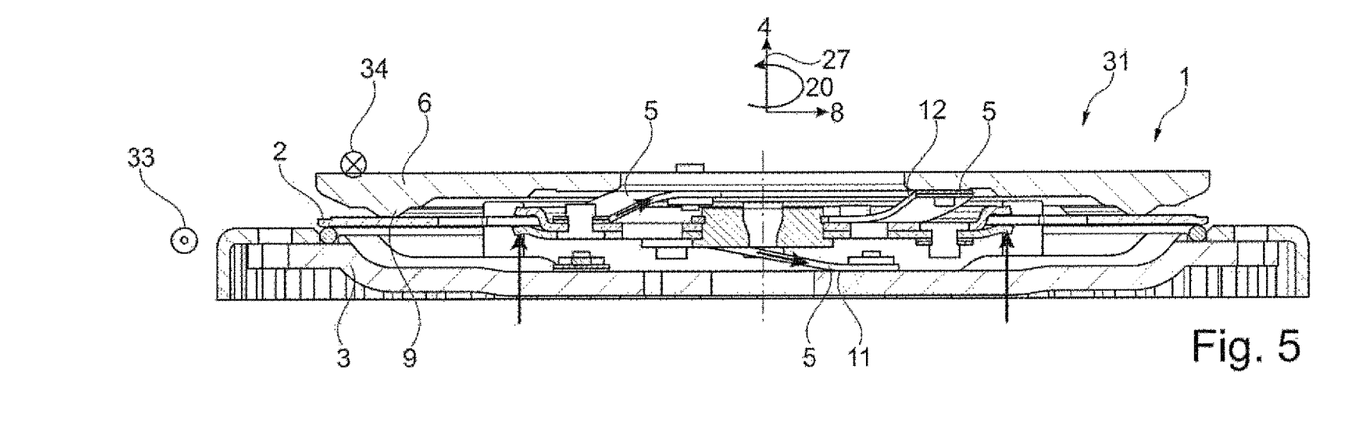
FIG. 5 shows the friction clutch according to FIGS. 3 and 4 in a side view in section in traction mode.
Figure 6:
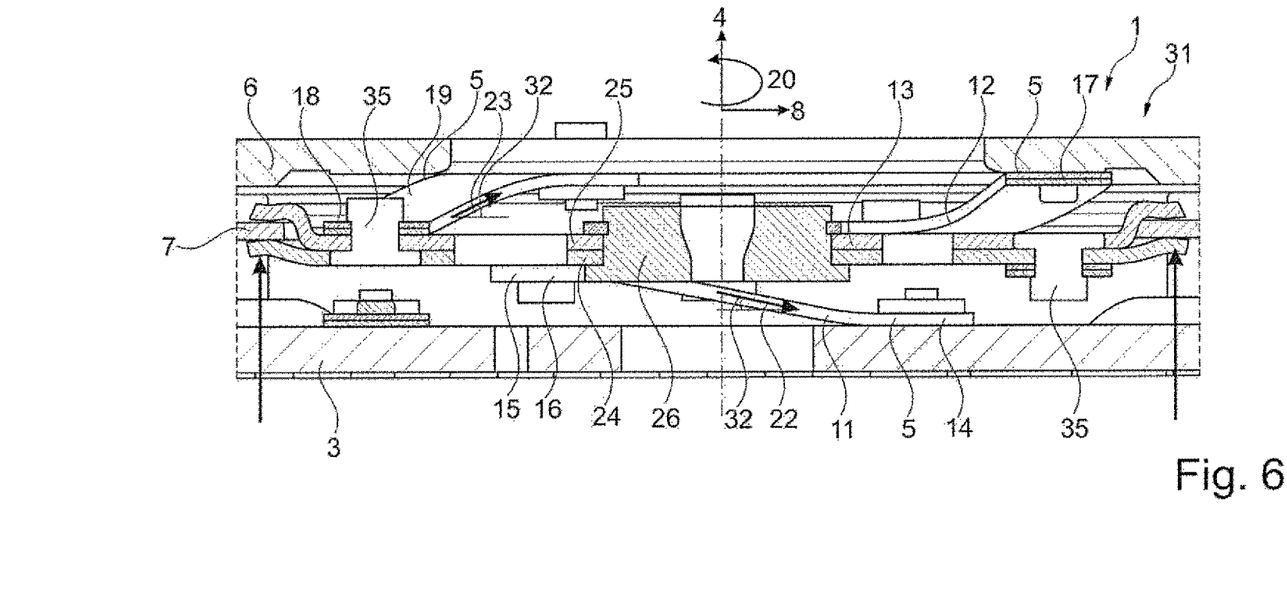
FIG. 6 shows a detailed view of FIG. 5.

The leaf springs 5 extend between a first end 14, 17 and a second end 15, 18, at least in a circumferential direction 20, 21 (ref. FIGS. 3, 5, 6) and in an axial direction 4. The leaf springs 5, in the radial direction 8, are arranged within pressure plate cams 9 on which the disk spring 2 is supported in a tiltable manner for engaging and disengaging the friction clutch 1 (i.e. for displacement of the pressure plate 6 in the axial direction 4).

The leaf springs 5, here the second ends 15, 18 of the leaf springs 5 in each case, are connected to the tongues 7 of the disk spring 2 in a fixed manner via the thrust piece 13 in the axial direction 4 in order to exert a force on the tongues 7 of the disk spring 2 which engages the friction clutch 1 in the traction mode 31 of the internal combustion engine (accelerating torque is transmitted via the clutch cover 3 to the pressure plate 6 and the counter-plate 28 and, from these, to the clutch disk 29) and to exert a force on the tongues 7 of the disk spring 2 which disengages the friction clutch 1 in the coasting mode 30 of the internal combustion engine (clutch cover 3 is driven by the clutch disk 29).

The torsion-resistant attachment of the pressure plate 6 to the clutch cover 3 is realized at a certain relief angle 10.

In the illustrated exemplary embodiment, a friction clutch 1 is shown with a tensioned disk spring 2, which is actuated by the gearbox input shaft 36.

FIG. 3 shows the friction clutch 1 according to FIG. 1 in a view along the axis of rotation 27. FIG. 4 shows the friction clutch 1 according to FIG. 3 in a side view in section. In contrast to FIGS. 1 and 2, at least the counter-plate 28 and the clutch disk 29 are not illustrated here. Please refer to the embodiments in FIGS. 1 and 2.

The direction of rotation 33 of the clutch cover 3 and the braking direction 34 of the pressure plate 6 are illustrated. The friction clutch is in traction mode 31 (ref. FIGS. 5 and 6). The braking direction 34 (illustrated in FIG. 4) of the pressure plate 6 extends into the plane of the drawing, the direction of rotation 33 extends out of the plane of the drawing.

FIG. 5 shows the friction clutch 1 according to FIGS. 3 and 4 in a side view in section in traction mode 31. FIG. 6 shows a detailed view of FIG. 5. Please refer to the embodiments in FIGS. 1 to 4.

Two groups 11, 12 of leaf springs 5 are provided, namely clutch-cover-side (first group 11) and pressure-plate-side (second group 12) leaf springs 5, which are connected to one another via a thrust piece 13 in which the tongues 7 of the disk spring 2 are received in an axially fixed manner.

A pressure-plate-side thrust piece (second thrust-piece disk 25) is provided here, which is attached to the pressure plate 6 in a torsion-resistant manner via (a) pressure-plate-side (second group 12 of) leaf springs 5, and a clutch-cover-side thrust piece (first thrust-piece disk 24), which is attached to the clutch cover 3 in a torsion-resistant manner via (a) clutch-cover-side (first group 11 of) leaf springs 5.

The leaf springs 5 of the first group 11 are attached by a first end 14 to the clutch cover 3 and by a second end 15 to a respective first attachment 16 on the thrust piece 13. The leaf springs 5 of a second group 12 are attached by a first end 17 to the pressure plate 6 and by a second end 18 to a respective second attachment 19 on the thrust piece 13.

The first attachments 16 and the second attachments 19 are arranged between the pressure plate 6 and the clutch cover 3 in the axial direction 4.

Each leaf spring 5 of the first group 11 extends from the first end 14 to the second end 15 in a first circumferential direction 20 and each leaf spring 5 of the second group 12 extends from the first end 17 to the second end 18 in an aligned first circumferential direction 20.

The leaf springs 5 of the first group 11 extend in the axial direction 4 between the first end 14 and the second end 15, at a maximal first angle 22 with respect to a circumferential direction 20, 21, and the leaf springs 5 of the second group 12 extend in the axial direction 4 between the first end 17 and the second end 18, at a maximal second angle 23 with respect to a circumferential direction 20, 21, wherein the first angle 22 and the second angle 23 are the same size.

The thrust piece 13 comprises a first thrust-piece disk 24 and a second thrust-piece disk 25, which are connected to one another via rivets 35, wherein the tongues 7 of the disk spring 2 are arranged 4 between the first thrust-piece disk 24 and the second thrust piece disk 25 in the axial direction.

The leaf springs 5 are connected to the thrust piece 13 or the respective thrust-piece disk 24, 25 via rivets 35, specifically via the rivets 35 which are provided for connecting the thrust-piece disks 24, 25 to one another.

The disk spring 2 can be actuated for the displacement of the pressure plate 6 via the thrust piece 13. The thrust piece 13 is connected to a hub 26, on which the thrust-piece disks 24, 25 are arranged in an axially fixed manner. The thrust piece 13 (and via the thrust piece 13, the disk spring 2) can therefore be actuated via the hub 26.

In the illustrated traction mode 31, the clutch cover 3 pulls on the thrust piece 13 in the first circumferential direction 20 (see direction of force 32 and direction of rotation 33, in the direction out of the plane of the drawing) via the first group 11 of leaf springs 5. The thrust piece 13 simultaneously pulls the pressure plate 6 via the second group 12 in the first circumferential direction 20 (or brakes the pressure plate 6 in the second circumferential direction 21, braking direction 34).

The angles 22, 23 of the leaf springs 5 are selected such that they act preferably equally and oppositely. In the illustrated traction mode 31, the generated axial forces of the leaf springs 5 act in the same axial direction 4 and push the clutch further closed, i.e. exert a self-reinforcing force in the engagement direction (see arrows pointing to the thrust piece 13 in the axial direction 4). In coasting mode (see FIGS. 7 and 8), the generated axial forces of the leaf springs 5 likewise act in the same direction and pull the friction clutch 1 open, i.e. disengage the friction clutch 1.

The pressure plate 6 introduces its torque via leaf springs 5 (second group 12 of leaf springs 5) into the thrust piece 13 (second thrust-piece disk 25) located below the pressure plate 6, i.e. on the pressure plate side, with reference to the accompanying figures. This torque is introduced via the rivets 35 of the leaf spring rivet arrangement on the pressure-plate side into the thrust piece 13 (first thrust-piece disk 24) on the coupling-cover side, which is arranged below the disk spring 2 with reference to the accompanying figures. This thrust piece 13 (first thrust-piece disk 24) is fastened to the coupling cover 3 via coupling-cover-side leaf springs 5 (first group 11 of leaf springs 5).

Figure 7:
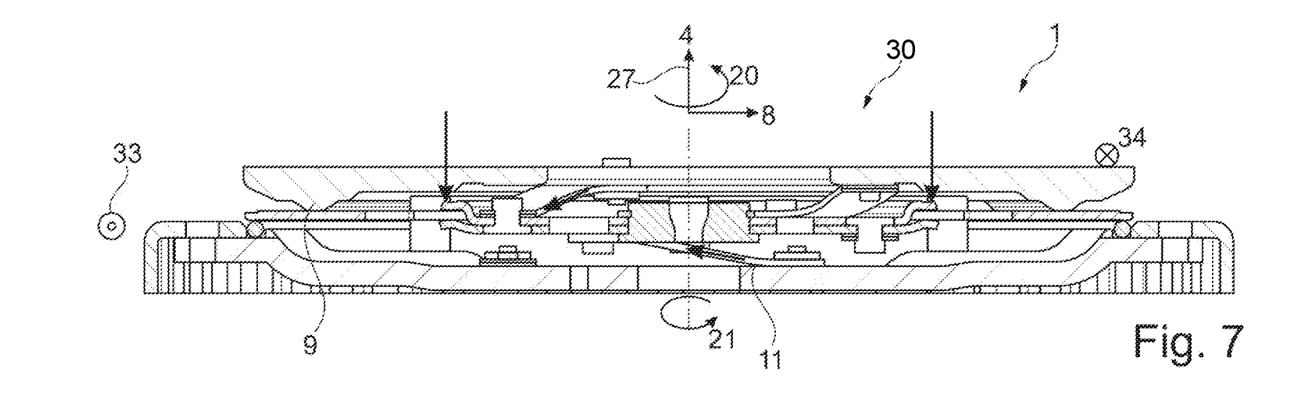
FIG. 7 shows the friction clutch according to FIGS. 3 and 4 in a side view in section in coasting mode.
Figure 8:
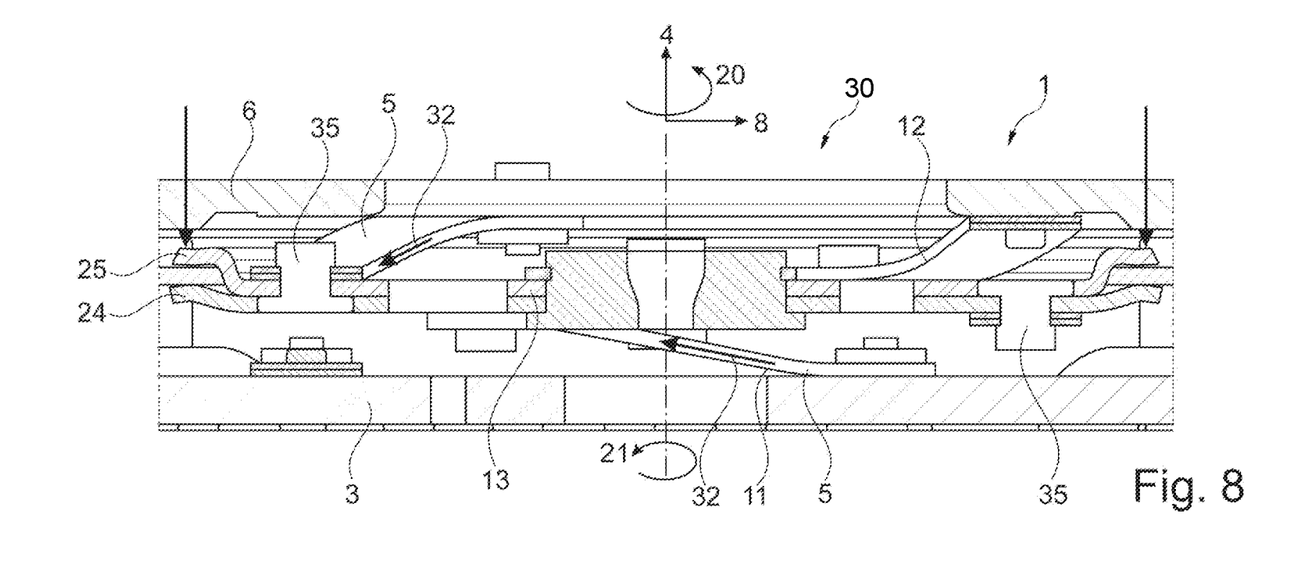
FIG. 8 shows a detailed view of FIG. 7.

FIG. 7 shows the friction clutch 1 according to FIGS. 3 and 4 in a side view in section in coasting mode 30. FIG. 8 shows a detailed view of FIG. 7. FIGS. 7 and 8 are described together below. Please refer to the embodiments in FIGS. 5 and 6.

In the illustrated coasting mode 30, the clutch cover 3 is pulled by the thrust piece 13 in the second circumferential direction 21 (see direction of force 32, braking direction 34, in the direction out of the plane of the drawing, and direction of rotation 33, in the direction into the plane of the drawing) via the first group 11 of leaf springs 5. The thrust piece 13 is simultaneously pulled by the pressure plate 6 in the second circumferential direction 21 via the second group 12. In coasting mode 30 the generated axial forces of the leaf springs 5 (see arrows pointing to the thrust piece 13 in the axial direction 4) likewise acting in the same direction and pull the friction clutch 1 open, i.e. disengage the friction clutch 1.

REFERENCE NUMERALS

1 Friction clutch
2 Disk spring
3 Clutch cover
4 Axial direction
5 Leaf spring
6 Pressure plate
7 Tongue
8 Radial direction
9 Pressure plate cam
10 Relief angle
11 First group
12 Second group
13 Thrust piece
14 First end (first group)
15 Second end (first group)
16 First attachment
17 First end (second group)
18 Second end (second group)
19 Second attachment
20 First circumferential direction
21 Second circumferential direction
22 First angle
23 Second angle
24 First thrust-piece disk
25 Second thrust-piece disk
26 Hub
27 Axis of rotation
28 Counter-plate
29 Clutch disk
30 Coasting mode
31 Traction mode
32 Direction of force
33 Direction of rotation
34 Braking direction
35 Rivet
36 Gearbox input shaft

The invention claimed is:

1. A friction clutch comprising:
an axis of rotation;
a disk spring for engaging the friction clutch, the disk spring comprising tongues;
a plurality of leaf springs axially fixed to the tongues;
a clutch cover; and
a pressure plate, axially displaceable relative to the clutch cover and attached to the clutch cover in a torsion-resistant manner by the plurality of leaf springs, wherein:
the pressure plate comprises cams;
the disk spring is supported on the cams in a tiltable manner for engaging and disengaging the friction clutch; and
the leaf springs are arranged within the cams in a radial direction.

2. The friction clutch of claim 1, wherein the pressure plate is attached to the clutch cover at a certain relief angle.

3. The friction clutch of claim 1, further comprising a thrust piece, wherein:
the plurality of leaf springs comprises:
a clutch-cover-side group of leaf springs; and
a pressure-plate-side group of leaf springs connected to the clutch-cover-side group of leaf springs by the thrust piece; and
the tongues are received in the thrust piece in an axially fixed manner.

4. The friction clutch of claim 3, wherein:
the thrust piece comprises:
a first thrust-piece disk; and
a second thrust-piece disk connected to the first thrust-piece disk; and
the tongues are arranged axially between the first thrust-piece disk and the second thrust-piece disk.

5. The friction clutch of claim 3, wherein the thrust piece is arranged to actuate the disk spring to displace the pressure plate.

6. The friction clutch of claim 3, wherein:
each one of the clutch-cover-side group of leaf springs is attached to the clutch cover at a first end and to a first attachment on the thrust piece at a second end; and
each one of the pressure-plate-side group of leaf springs is attached to the pressure plate at a third end and to a second attachment on the thrust piece at a fourth end.

7. The friction clutch of claim 6, wherein the first attachment and the second attachment are each arranged axially between the pressure plate and the clutch cover.

8. The friction clutch of claim 6 wherein:
each one of the clutch-cover-side group of leaf springs extends from the first end to the second end in a first circumferential direction; and
each one of the pressure-plate-side group of leaf springs extends from the third end to the fourth end in the first circumferential direction.

9. The friction clutch of claim 6, wherein:
each one of the clutch-cover-side group of leaf springs extends from the first end to the second end in an axial direction at a maximal first angle with respect to a circumferential direction;
each one of the pressure-plate-side group of leaf springs extends from the third end to the fourth end in the axial direction at a maximal second angle with respect to the circumferential direction; and
the maximal first angle and the maximal second angle are equal.

10. A friction clutch comprising:
a rotational axis;
a clutch cover;
a pressure plate rotationally fixed and axially displaceable relative to the clutch cover;
a disk spring disposed axially between the clutch cover and the pressure plate and comprising a tongue;

a first leaf spring comprising a first end axially fixed relative to the tongue and a second end fixed to the clutch cover; and a second leaf spring comprising a third end axially fixed relative to the tongue and rotationally fixed relative to the first end, and a fourth end fixed to the pressure plate.

11. The friction clutch of claim 10 wherein:

the first leaf spring extends in a first rotational direction from the first end to the second end; and the second leaf spring extends in the first rotational direction from the third end to the fourth end.

12. The friction clutch of claim 10, wherein:

the pressure plate comprises a plurality of cams circumferentially disposed about the rotational axis; and the disk spring is arranged to pivot on the plurality of cams to displace the pressure plate and engage the friction clutch.

13. The friction clutch of claim 12 further comprising a thrust piece:

axially fixed relative to the tongue; and fixed to the first end and the third end.

14. The friction clutch of claim 13 wherein the first leaf spring, the second leaf spring, and the thrust piece are all disposed radially within the plurality of cams.

15. The friction clutch of claim 13 wherein the thrust piece is fixed to the first end by a first rivet and to the third end by a second rivet, circumferentially offset from the first rivet.

16. The friction clutch of claim 13 further comprising a hub axially fixed to the thrust piece for axially displacing the thrust piece to engage the friction clutch.

17. The friction clutch of claim 13 wherein the thrust piece comprises:

a first thrust piece disk disposed on a first axial side of the tongue; and a second thrust piece disk disposed on a second axial side of the tongue, opposite the first axial side.

* * * * *